United States Patent
Hayashi

[11] Patent Number: 5,124,163
[45] Date of Patent: Jun. 23, 1992

[54] METHOD FOR STRETCHING DOUGH

[75] Inventor: Torahiko Hayashi, Utsunomiya, Japan

[73] Assignee: Rheon Automatic Machinery Co., Ltd., Utsunomiya, Japan

[21] Appl. No.: 724,042

[22] Filed: Jul. 1, 1991

Related U.S. Application Data

[62] Division of Ser. No. 697,564, May 9, 1991.

[30] Foreign Application Priority Data

May 12, 1990 [JP] Japan .................. 2-121780

[51] Int. Cl.[5] ............................. A21D 8/00
[52] U.S. Cl. .................... 426/231; 426/502; 426/517
[58] Field of Search ............ 426/231, 496, 502, 517; 425/363, 135, 141

[56] References Cited

U.S. PATENT DOCUMENTS 4,276,317  6/1981  Hayashi .................. 426/502
4,398,877  8/1983  Taylor .................... 425/363

Primary Examiner—George Yeung
Attorney, Agent, or Firm—Guy W. Shoup

[57] ABSTRACT

A dough-stretching roller apparatus is provided to produce a continuous web of dough in a process to manufacture confectionery and bread. The apparatus includes a pair of upper rollers and a pair of lower rollers, a sensor means that measures the width of the dough that contacts the lower rollers, and a controller that controls a motor driving the upper rollers in response to a signal from the sensor means. The controller increases the rotational speed of the upper rollers when the sensors detect that the width of dough is less than a preset width while the controller decreases the rotational speed of the upper rollers when the sensors detect that the width of the dough is greater than the preset width. Thus, even if the quantity of dough supplied from a hopper is unstable, the stable production of a stretched web of dough having a constant volume over its length can be continued.

2 Claims, 5 Drawing Sheets

METHOD FOR STRETCHING DOUGH

This application is a division of application Ser. No. 07/697,564, filed May 9, 1991.

BACKGROUND OF THE INVENTION

1. Field of the Invention

This invention relates to a method and apparatus for stretching dough that is used to produce a continuous web of dough, in a process to produce confectionery and bread. Specifically, the apparatus stores data on various producing conditions, including the producing speed, width, and thickness of such a continuous web of dough, in an arithmetic and logical processing unit, so that a mass of dough in a hopper can be stretched into an averaged and continuous web of dough, and which can then be discharged to be supplied at a preset rate to a following production line.

2. Prior Art

FIGS. 4 and 5 show an example of a dough-stretching roller apparatus of the prior art. It includes two pairs of facing pressure-applying rollers 40, 41, which are located in a vertically-spaced apart relation. A dough hopper 2 is located above the rollers 40, and supplies dough 1 into the gaps between the rollers 40 and 41. The dough is stretched and then is fed toward a following production line. By this apparatus dough can be stretched into a web having a uniform thickness. However, when the quantity of dough remaining in the hopper changes or when it is too hard or too soft, the quantity of dough finally discharged from the lower rollers inevitably changes. This results in that the preset quantity of dough cannot always be discharged.

As stated above, because the quantity of dough is not uniformly discharged from the upper roller pair 40, the lower roller pair 41 compresses such a non-uniform quantity. Therefore, when the quantity of dough supplied from the lower roller pair 41 is small, the web of dough tends to be severed as shown at point B in FIG. 5, while when the quantity of dough supplied from the upper roller pair 40 is excessively large, the web of dough tends to accumulate as shown at point C in FIGS. 4 and 5. Thus, neither the width nor the thickness of the web of dough produced is uniform. The desired web of dough cannot be stably produced.

SUMMARY OF THE INVENTION

This invention provides an apparatus for stretching dough. It comprises a pair of upper rollers and lower rollers. Each roller pair has a preset gap between each of its rollers. The upper rollers supply the dough into the gap between the lower rollers. The rotational speed of the upper rollers is controllable. The rotational speed of the lower rollers is constant. Sensor means are provided on each side of the dough flow and above the gap between the lower rollers, and sense the rotational angle of the lower rollers when the dough is fed into the gap between the lower rollers, from the point where the outermost part of the dough contacts the surface of each of the lower rollers to a preset point, for instance the point where the lower rollers are the nearest. Another sensor means can be used to sense the thickness of the dough before it is fed into the gap between the lower rollers. The rotational speed of the lower rollers is controlled in response to the signals from the sensors means, so that the quantity of dough discharged from the lower rollers can be kept constant.

That is, when the gap between, and the rotational speed of, the upper and lower rollers, are kept constant, a change in the quantity of dough discharged from the upper rollers appears as a change in an angle of the lower rollers about its axis between the line connecting the two rollers and the line connecting the axis and the point where the outermost part of the dough contacts the surface of each of the rollers. When the angle lies within a preset range, the internal stress of the dough is small, and the dough is kept in its steady state without any substantial destruction of its tissue structure, so that the dough can be stably stretched. If otherwise, the rotational speed of the upper rollers is changed in response to a detected change in an angle of the lower rollers when the dough is fed into the gap between them, so as to suitably adjust the discharged amount of the dough.

In one preferred embodiment of the invention the sensor means comprises two sensors, one of which is located on each side of the dough flow and above the gap between the lower rollers.

In another preferred embodiment of this invention, the controller increases the rotational speed of the upper rollers when the signal from the sensor means indicates a smaller angle than the preset range of angles, and the controller decreases the rotational speed of the upper rollers when the signal from the sensor means indicates a larger angle than the preset range of angles.

Thus, an object of this invention is to provide a method and apparatus for stretching dough that has a uniform width and a uniform thickness.

Another object of this invention is to provide a method and apparatus for stretching dough that changes the rotational speed of the upper rollers in response to the rotational angle, as defined above, of the lower rollers, when the dough is fed into the gap between them, so that dough having a uniform volume over its length can be discharged from the gap between the lower rollers 4, which rotate at a constant speed.

DESCRIPTION OF THE PREFERRED EMBODIMENT

Figure 1:
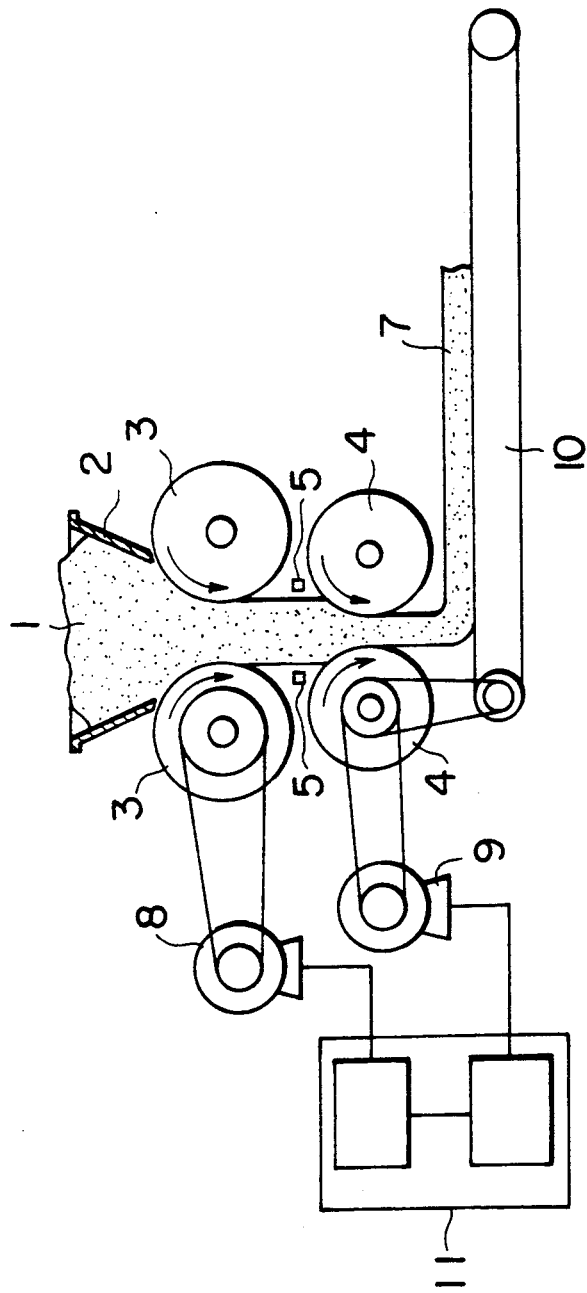
FIG. 1 is a schematic sectional front view of one embodiment of this invention.
Figure 2:
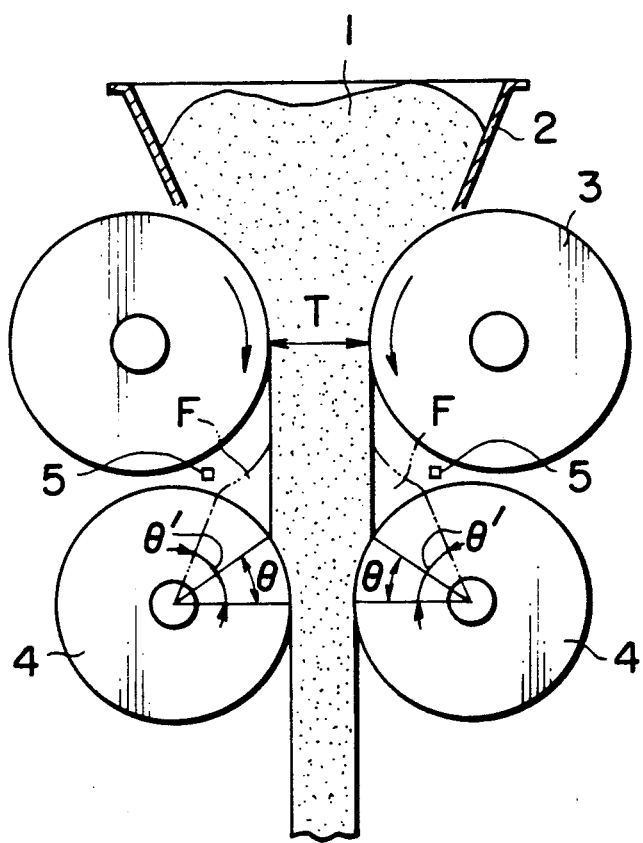
FIG. 2 shows a schematic sectional and partial front elevational view of the same embodiment of this invention.

FIG. 1 shows a schematic arrangement of an embodiment of this invention. It includes a hopper 2 to stock a mass of dough 1. A pair of upper cylindrical rollers 3 is located under the hopper 2. The rollers 3 are disposed to define a preset gap between them, such as a distance T as shown in FIG. 2. The rollers 3 are rotated by motor 8 in opposite directions as shown by arrows. The motor 8 is controlled by control signals generated from a controller 11. The upper rollers 3 receive a mass of dough 1 stocked in the hopper 2 and feed it downward.

A pair of lower cylindrical rollers 4 is located under the pair of the upper rollers 3. The rollers 4 are disposed to define a preset gap between them in line with the gap between the upper rollers 3. The rollers 4 are driven by a motor 9 and rotate at a constant speed, so that the web of dough is uniformly fed from them onto a delivery conveyor 10. The delivery conveyor 10 is also driven by the motor 9. The motor 9 is controlled by a control signal generated from the controller 11 to increase or decrease the production rate of a stretched web 7 of dough. The rotational speed of the lower rollers 4 determines the production rate of the stretched web 7 of dough. The delivery conveyor 10 supplies the stretched web 7 of dough to the following production line. As shown in FIG. 1, the gap between the lower rollers 4 is smaller than that between the upper rollers 3. The size of the gap between the lower rollers 4 can be suitably selected.

One sensor 5 is located on each side of a dough flow fed into the gap between the lower rollers 4. The sensors 5 sense the thickness of the dough 1 before it passes through the gap between the lower rollers 4. That is, when the mass of dough 1 is fed into the gap between the lower rollers 4, the dough flow has a thickness greater or lesser than that of the desired range before it enters the gap. Each sensor 5 separately detects the distance between it and the surface of the dough, and transmits a signal indicative of that distance to the controller 11. The controller 11 calculates an angle $\theta$ that indicates the point where the outermost part of the dough contacts the surface of the roller 4. In this specification this angle will be called an entrance angle. In FIG. 2 the solid lines passing through the pairs of rollers show the thickness of the dough. The angle $\theta$ is the entrance angle for the dough in solid lines. When the relative rotational speed of the upper rollers 3 is slow, the dough tends to accumulate on the lower rollers 4, as shown by F. The broken lines above the lower rollers 4 show an example of the outermost surfaces of the dough when it accumulates.

To keep the internal stress of the dough within an appropriate range, a range of the entrance angle $\theta$ is preset. For example, the range may be from a horizontal position to a point where the outermost part of the dough that is supplied from the gap between the upper rollers 3 contacts the surface of the lower roller 4. That is, when the entrance angle $\theta$ lies within the preset range, the web of dough that is discharged from the lower rollers 4 has a uniform width and a uniform thickness. When the angle is greater than the preset range, as shown by the the angle $\theta'$, the rotation speed of the upper rollers 3 is decreased. As a result, the mass of dough supplied from the upper rollers 3 is decreased. Thus, the angle $\theta$ decreases, so that dough having a uniform volume over its length can be discharged from the gap between the lower rollers 4 without any destruction of the tissue structure.

Figure 3:
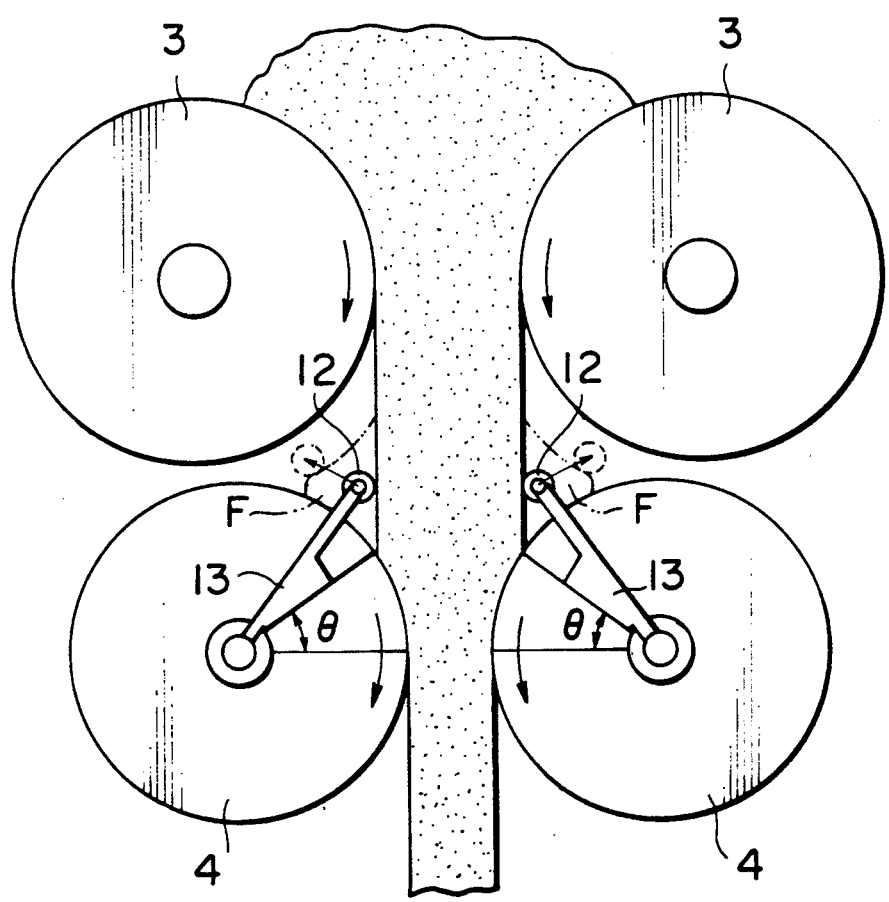
FIG. 3 is a schematic sectional and partial front view of another embodiment.
Figure 4:
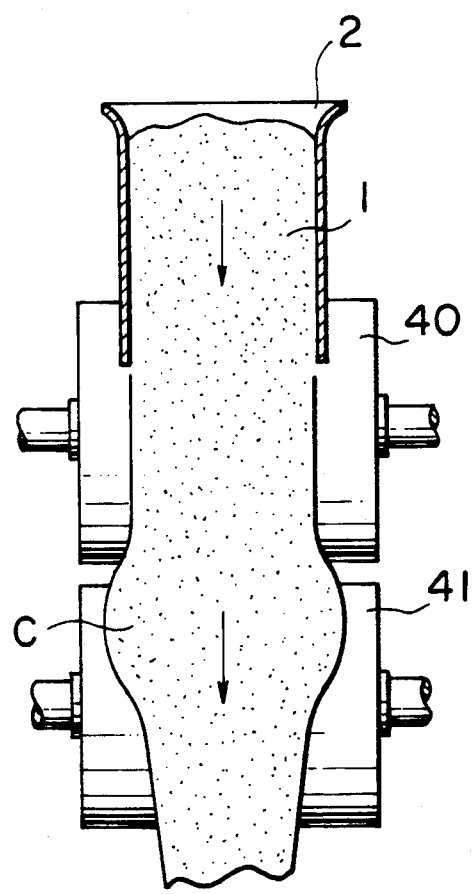
FIG. 4 shows a schematic sectional and partial side view of a prior art apparatus.
Figure 5:
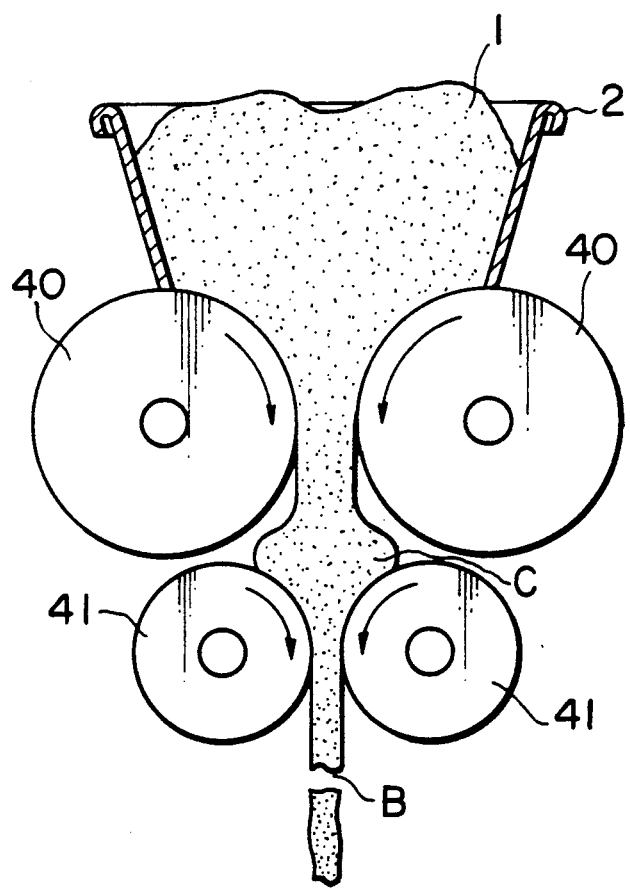
FIG. 5 shows a schematic sectional and partial front view of the same prior art apparatus.

FIG. 3 shows another embodiment of this invention. It shows small contact rollers 12 mounted on the respective free ends of rockable arms 13, which in turn are rotatably mounted on the respective shafts of the lower rollers 4. When these small contact rollers 12 contact the surface of the dough 1 that is fed downward from the upper rollers 3 toward the lower rollers 4, the arms 13 carrying the small contact rollers 12 incline based on the degree of the increase or decrease of the thickness of the dough. Thus, the inclination of each arm 13 indicates the dough entrance angle $\theta$.

In operation the upper rollers 3 are rotated at a preset initial speed so as to downwardly feed the mass of dough 1 stocked in the hopper 2. By the rotation of the upper rollers 3, the mass of dough 1 is guided toward and into the gap T between the rollers 3, where it is compressed and fed toward the gap between the lower rollers 4 at an entrance angle $\theta$ relative to each lower roller 4.

When the rotation speed of the motor 9 is increased so as to increase the production rate of the stretched sheet of dough 7, the rotation speed of the lower rollers 4 is increased, and the conveying speed of the conveyor 10 is also synchronously increased to transport the stretched sheet of dough 7.

When the increase in the rotation speed of the lower rollers 4 results in a shortage of a quantity of dough fed from the gap between the upper rollers 3, the entrance angle $\theta$ is correspondingly decreased and the dough thus tends to be severed. The sensors 5 sense the entrance angle $\theta$ and generate an output signal indicative of such an entrance angle $\theta$. The sensors 5 then supply it to the controller 11. The controller 11 supplies a signal to increase the rotation speed of the upper rollers 3 until the entrance angles $\theta$ coincide with the setting or fall within the preset range. The upper rollers 3 thus rotate at the controlled speed and continue to feed the dough 1 into the gap between the lower rollers 4.

In contrast, when the rotation speed of the lower rollers 4 is decreased so as to decrease the production rate, the entrance angle $\theta$ is increased and the dough tends to accumulate above the gap between the lower rollers 4. The sensors 5 sense such an increase in the entrance angles $\theta$ and transmit a signal indicating that increase to the controller 11. The controller 11 controls the rotation speed of the upper rollers 3 to decrease the quantity of the dough that is fed from the gap between the lower rollers 3. As a result, the dough is uniformly fed from the gap between the lower rollers 4.

If the quantity of dough 1 stocked in the hopper 2 decreases, and the dough-feeding capability of the upper rollers 3 is correspondingly lowered, the rotation speed of the upper rollers 3 is increased so as to restore the dough-feeding capability.

As explained above, even if the gap T between the upper rollers 3 is maintained at the preset value, the quantity of dough fed from the gap between the upper rollers 3 is not always constant, due to the varying amount of the dough remaining in the hopper 2. Also, the quantity of dough supplied by the rollers 3 is not always constant because the consistency of the dough is not uniform. Any variation in the amount of dough that is fed from the gap between the upper rollers 3 appears as a corresponding variation in the entrance angles $\theta$ of the lower rollers 4 above the gap between them. These variations in the entrance angles $\theta$ are sensed to control the rotation speed of the upper rollers 3 so that the amount of the discharged dough can be kept constant. Thus, dough having a uniform volume over its length can be discharged from the gap between the lower rollers 4, which rotate at a constant speed.

From the foregoing explanations it will be understood that the present invention provides a simple and convenient apparatus and method for stretching dough in which, by merely continuously measuring changes in the quantity of dough that is fed from the gap between the upper rollers a stretched sheet of dough having a uniform width and a uniform thickness can be easily discharged without any destruction of the tissue structure of the dough.

I claim:

1. A method for stretching dough comprising the steps of providing a pair of upper rollers and a pair of lower rollers under the upper rollers, each pair of rollers being disposed to define a preset gap between them and rotating in a downwardly-feeding direction, the upper rollers at a variable speed and the lower rollers at a constant speed, feeding dough from the gap between the upper rollers into the gap between the lower rollers, measuring, when the dough is fed into the gap between the lower rollers, a rotational angle at each lower roller from a point where the surface of the dough contacts the outermost part of the lower roller to a preset point, comparing the angle with a preset range of angles, and controlling the rotational speed of the upper rollers to make the angle lie within the preset range of angles, so that dough having a uniform volume over its length can be discharged from the gap between the lower rollers without any destruction of the tissue structure of the dough.

2. A method for stretching dough comprising the steps of providing a pair of upper rollers and a pair of lower rollers under the upper rollers, each pair of rollers being disposed to define a preset gap between them and rotating in a downwardly feeding direction, the upper rollers at a variable speed and the lower rollers at a constant speed, feeding dough from the gap between the upper rollers into the gap between the lower rollers, measuring a thickness of the dough before it is fed into the gap between the lower rollers, comparing the thickness with a preset range of thicknesses, and controlling the rotational speed of the upper rollers to make the thickness lie within the preset range of thicknesses, so that dough having a uniform volume over its length can be discharged from the gap between the lower rollers without any destruction of the tissue structure of the dough.

* * * * *